United States Patent [19]

Barua et al.

[11] Patent Number: 4,609,554
[45] Date of Patent: Sep. 2, 1986

[54] ASEPTIC YOGHURT

[75] Inventors: Nripen N. Barua, Ajax; Richard J. Hampton, Howick, both of Canada

[73] Assignee: Ault Foods Limited, Scarborough, Canada

[21] Appl. No.: 755,558

[22] Filed: Jul. 17, 1985

Related U.S. Application Data

[63] Continuation of Ser. No. 582,875, Feb. 16, 1984, abandoned, which is a continuation of Ser. No. 347,961, Feb. 11, 1982, abandoned.

[51] Int. Cl.$^4$ ............................................. A23C 9/137
[52] U.S. Cl. ..................................... 426/43; 426/522; 426/583
[58] Field of Search ................. 426/583, 521, 522, 34, 426/42, 40, 43, 409

[56] References Cited

U.S. PATENT DOCUMENTS

| | | | |
|---|---|---|---|
| 2,719,793 | 10/1955 | Page | 426/34 |
| 3,235,387 | 2/1966 | Stumbo et al. | 426/34 |
| 3,359,116 | 12/1967 | Little | 426/583 |
| 3,529,363 | 11/1970 | Morgan | 426/36 |
| 3,969,534 | 7/1986 | Pavey et al. | 426/34 |

OTHER PUBLICATIONS

Food Science Technology Abstracts 8, Abstract 2 P237 (1976), (Abstract of Kalab et al., Journal of Dairy Research, 42, 453-58 (1975)).

*Primary Examiner*—Raymond N. Jones
*Assistant Examiner*—Marianne M. Cintins
*Attorney, Agent, or Firm*—Fisher, Christen & Sabol

[57] ABSTRACT

An aseptic yoghurt having an extended shelf life is prepared by a unique combination of natural yoghurt formulations, including relatively low levels of sugar and starch. Special processing conditions are also effected whereby the protein in the natural yoghurt is preconditioned while the starch remains substantially unaltered followed by homogenization at lower than usual pressures and subsequently pasteurization to obtain the yoghurt product which has an extended shelf life without refrigeration.

24 Claims, No Drawings

ASEPTIC YOGHURT

This application is a continuation of application Ser. No. 582,875, filed Feb. 16, 1984, now abandoned which in turn is a continuation of application Ser. No. 347,961 filed Feb. 11, 1982, now abandoned.

The present invention relates to food and in particular, the production of an aseptic yoghurt product.

BACKGROUND OF INVENTION

Yoghurt is a form of fermented milk curdled to a smooth creamy or custard-like consistency by lactic acid-producing microorganisms. The production of natural yoghurt entails the innoculation of a fluid milk substrate, which may contain other components, for example, stabilizers and sugar, with a beneficial culture of *Lactobacillus bulgaricus* and *Streptocacuus Thermophilus* followed by incubation at a temperature of about 100°–110° F. until the pH of the substrate is reduced to about 4.5 to 4.3 which indicates that conversion to the desired product, yoghurt, has been completed. The yoghurt is then cooled to inhibit or prevent growth of undesirable microflora. The milk substrate, and the natural yoghurt produced have a solids content of about 11–13% by weight. The incubation may take place in the individual containers in which the yoghurt is to be sold or may take place in a vat or similar vessel and when complete, the yoghurt transferred into the individual containers. Fruit, fruit preserves or other flavourings may be added to the plain yoghurt base. The increase in yoghurt consumption in recent years, especially in North America, has been quite phenomenal (for example, between 1960 and 1975 per capita consumption in the United States increased 483%). Because of the greatly increased demand, yoghurt is now produced on a large scale and sold in a wide variety of retail outlets, including supermarkets, etc. However, the product is highly perishable and requires refrigeration if it is to be kept for even limited periods of time; the maximum shelf life for a natural yoghurt under refrigerated conditions being only several weeks. Consequently, it may only be transported to a limited extent. There has, therefore, not surprisingly been many attempts to treat yoghurt so as to extend its shelf life and also render refrigeration unnecessary. Those attempts have taken many forms. For example, Ferguson in U.S. Pat. No. 3,080,236, produces an instant yoghurt which requires no refrigeration and has a long shelf life by implanting a culture in whole or skimmed milk having the used milk solids content and following incubation at about 100° F. for 12 hours, the yoghurt so-produced is reduced in volume by evaporation and then substantially dried in vacuum driers. That product, when powdered is admixed with a variety of other components including a minimum of 10% of an instant water soluble starch, which is needed to provide sufficient body to the reconstituted yoghurt, and a fat to give the product the appearance and taste of yoghurt. Schut in U.S. Pat. No. 4,066,794 discloses a similar instant yoghurt preparation where the "body" in the reconstituted yoghurt is provided by a greater than 5% by weight of sodium alginate, a gelling or settling agent which is said to impart a curd-like consistency having thixotropic qualities to the reconstituted product, as well as almost 70% by weight of sugar. An alternative route to a yoghurt having an extended shelf life is taught by Egli et al in U.S. Pat. No. 3,932,680. That patent discloses a process which produces a sterile yoghurt. In that process, pasteurized and homogenized milk is concentrated 10%; 10% to 12% of sugar is added; the mixture cooled and incubation to a pH of 4.0 to 4.3 is effected using cultures of lactic acid bacteria over a period of 2.5 to 4 hours at a temperature of from 42°–44° C., the resulting yoghurt base being cooled to between 30°–20° C. Subsequently, it is further cooled to a temperature of from 12°–4° C. when an effective amount of the following stabilizers are added:

Stabilizer A which contains by weight, 20–30% emulsifier; 20–40% carrageenan; 30–40% carboxymethyl-cellulose; 2–3% carobbean meat or powder; and 4–8% guar meal;

Stabilizer B which is potato starch or other starch; and

Stabilizer C which contains by weight 75–85% of 60% modified gelatin and sucrose (the carrier for the dissolving or distribution of protein.

The resulting mass is then allowed to stand at 4°–12° C. for 5–7 hours when, presumedly the yoghurt has been produced. The yoghurt is then introduced into containers which are hermetically sealed and subjected to a sterilizing procedure involving heating the containers in an autoclave at 60°–85° C. and a pressure of up to 2 atmospheres for a time sufficient to sterilize the product and the packages, cooling under pressure to a temperature of from 10°–15° C. and, finally, storing the packages for 2 to 4 days at a temperature of from 4° to 6° C. To say the least, the described process is extremely complex and time consuming, most probably to the extent that the process cannot be worked economically on an industrial scale. In fact, applicant believes that there are no sterile true yoghurt products on sale, at least in North America, at the present time (several attempts to market such products over the last several years having failed). Reference may be made once again to the relatively high sugar content and also to the fact that cooling prior to the thermal treatment is essential if syneresis of whey in the final product is to be avoided. A modified embodiment of the invention of U.S. Pat. No. 3,932,680 is described in U.S. Pat. No. 4,235,934.

There are many problems associated with producing a thermally treated sterile yoghurt, the most important from a consumer acceptance viewpoint basic difficulty being that the yoghurt body or texture consists of a delicate protein matrix which can easily be disrupted and destroyed by heat and also by mechanical action such as pumping or the like required in a commercial processing operation. In addition, heat treatment can result in the yoghurt's characteristic flavour can be seriously degraded to the extent that in many prior art thermally treated yoghurt products, following the thermal treatment, it is necessary to include a component which imparts a "yoghurt flavour" to the final product. Consequently, it is not possible merely to sterilize standard yoghurt and obtain a product that will be acceptable to the consumer. As the prior art extensively demonstrates, the retention of yoghurt taste and texture is essential if an acceptable product is to be obtained and the prior art products, leave much to be desired in one, or generally both, of those characteristics.

It is an object of the present invention to economically provide a sterile or ascept natural yoghurt having the taste and texture of natural yoghurt and which has an extended shelf life without refrigeration.

GENERAL STATEMENT OF INVENTION

It has been found that the above object can be achieved if following incubation, and whilst the yoghurt base is still at an elevated temperature, minor amounts of each of carrageenan, citric acid, a starch and sugar are admixed therewith; the resulting mixture is subjected to a special time/temperature treatment, whereby the protein is pre-conditioned whilst the starch is substantially not affected (not gelatinized) to any significant extent, and then subjected to a one-stage homogenization at lower than usual pressures followed by heating to pasteurization temperatures. If desired, the usual components which impart fruit or other flavourings, colour and the like plain yoghurt may be added, usually following homogenization and before pasteurization of the product.

DETAILED STATEMENT OF INVENTION

In one aspect, the present invention provides a process for the production of an aseptic yoghurt comprising:
- (a) maintaining a fluid milk substrate at an elevated temperature for a period of time sufficient to effect pasteurization;
- (b) cooling the pasteurized substrate to an incubation temperature within the range 100° to 115° F.;
- (c) subsequently innoculating said mixture with a yoghurt culture producing lactic acid and incubating said mixture until the pH is reduced to between 4.5 to 4.0 whereby a yoghurt base is produced;
- (d) admixing with said yoghurt base whilst still at an elevated temperature the following components:

| | |
|---|---|
| carrageenan | from 0.1% to 0.8% |
| citrate ion | from 0.05% to 2.0% |
| starch | from 0.5% to 2.5% |
| sugar | from 2.0% to 6.0% and |
| if required, water | in an amount such that the milk solids content of the total mixture is from 10% to 15%; |
| (all percentages being by weight based on the total mixture) | |

- (e) subjecting the natural yoghurt so produced to an elevated temperature/time treatment which effects pre-conditioning of the protein whilst substantially avoiding gelatinization of the starch;
- (f) homogenizing the mixture at a temperature of at most about 170° in only one stage and at a pressure of from 500 to 1500 psi;
- (g) optionally, introducing into the homogenized mixture flavour and/or aroma-imparting agents;
- (h) pasteurizing the resulting mixture at a temperature of at least 180° F.; and
- (i) cooling the aseptic yoghurt so produced to a temperatrue of less than 85° F.

Mixing of the base yoghurt with the other components in step (d) is advantageously carried out when said components are in the form of an aqueous slurry. This reduces the possibility of lumps being formed and assists in obtaining a uniform smooth dispersion. Moreover, this allows steps (a) (b) and (c) to be carried out using a milk substrate having a high solids content of preferably from 15 to 20%, since upon admixing the water content of the slurry reduces the solids content of the finished yoghurt to the usually desired level of from 10% to 15%. The increased solids content means a reduction in volume being treated and consequently smaller scale, and less expensive equipment may be used. Alternatively, a greater throughput of product can be achieved. If the components of step (d) are in dry condition which admixed with the base yoghurt care should be taken to ensure adequate dispersion of the solids throughout the mass and it may be expedient to utilize some low intensity mixing action to achieve the desired even distribution.

In a further aspect, the present invention provides a process for the production of an aseptic yoghurt comprising:
- (a) maintaining a fluid milk substrate having a total milk solids content of from about 15% to about 20% by weight at an elevated temperature for a period of time sufficient to effect pasteurization;
- (b) cooling the pasteurized mixture to an incubation temperature of from about 100° to about 115° F.;
- (c) subsequently innoculating said mixture with a yoghurt culture producing lactic acid and incubating said mixture until the pH is reduced to between about 4.5 to about 4.0 whereby a yoghurt base is produced;
- (d) admixing with said yoghurt base whilst still at an elevated temperature an aqueous slurry comprising the following:

| | |
|---|---|
| carrageenan | from about 0.1% to about 0.8% (preferably about 0.1%–about 0.5%) |
| citrate ion | from about 0.05% to about 2.0% |
| starch | from about 0.5% to about 2.5% (preferably about 0.5%–about 1.5%) |
| sugar | from about 2.0% to about 6.0% |
| water | in an amount such that the milk solids content of the total mixture is from about 10% to about 15%; |
| (all percentages being by weight based on the total mixture) | |

- (e) subjecting the natural yoghurt so produced to an elevated temperature/time treatment which effects pre-conditioning of the protein whilst substantially avoiding gelatinization of the starch;
- (f) homogenizing the mixture at a temperature of at most about 170° F. in only one stage and at a pressure of from 500 to 1500 psi;
- (g) optionally, introducing into the homogenized mixture flavour and/or aroma-imparting agents;
- (h) pasteurizing the resulting mixture at a temperature of at least 180° F.; and
- (i) cooling the aseptic yoghurt so produced to a temperature of less than 85° F.;

It is also preferred that up to 0.5% of pectin be admixed with the yoghurt base in step (d).

The product may then packed in a manner known per se under aseptic conditions in a previously sterilized container.

The various parameters involved and the criticality thereof to the present invention are discussed below:

Milk Substrate

It is preferable that the yoghurt produced according to the present invention have a milk solids content similar to natural yoghurt, i.e. between about 11% and about 15%, generally 11% and 13% by weight. In the production of natural yoghurt, the milk substrate usually has a total milk solids content similar to that desired in the final product. However, in the process of the present invention it has been found that the various constituents detailed in step (d) above are advantageously admixed with the yoghurt base in the form of an aqueous suspension, i.e. a further amount of water is added to the system thereby reducing the percentage amount of milk solids. The best results are obtained if the milk substrate prior to pasteurization and innoculation has a total milk solids content of from about 15% to about 20% be weight, preferably about 17% to about 18% by weight. That relatively high milk solids content may be obtained in several ways: for example, it may be obtained by concentration of liquid milk by vacuum evaporation or the like or, and preferably, is obtained by adding further milk solids in the form of skim milk, evaporate milk or the like. Usually, the further milk solids will be added to warm (about 100° F.) liquid milk. The milk substrate will, of course, include the usual amount of butterfat, say from 1 to 4% by weight.

The milk substrate having the above total milk solids content is pasteurized by methods well known in the art, for example, heating in a VAT process at 175°–200° F. for 5 to 30 minutes, shorter times being used, of course, at the higher temperatures. The pasteurized substrate is then cooled to the incubation temperature of from 95°–115° F.

Incubation

This is effected at a temperature of from about 95– about 115° F. preferably for about 2½ to 4 hours using from about 2% to 6% of a standard yoghurt producing culture, namely Lactobacillus Bulgaricus and Streptococcus Thermophilus. However, there is nothing novel per se in the culture, amount thereof or the general fermentation conditions used. Initially, the pH of the substrate is about 6.5 and upon completion, has dropped to from about 4.5 to 4.0, usually to about 4.2–3, a value obtained following about 3.5 hours fermentation. The pH will drop a little further during the remainder of the processing; the final product having a pH of from about 3.8 to 4.1. As a question of practice, the attainment of a predetermined pH is the indication that the incubation stage has been completed.

Additive Addition to Yoghurt Base

The additives referred to in step (d) must be added, or at least commenced to be added, whilst the yoghurt base is at an elevated temperature, i.e. greater than about 95° F.–100° F., although the addition may be completed whilst the mixture is cooling to some extent. However, addition must be substantially complete at a temperature of about 85° F. If the commencement of the addition is carried out following cooling of the yoghurt base to below about 95° F.–100° F., it is not possible to obtain even dispersion of the additives throughout the yoghurt base mass and "lumping" occurs which cannot subsequently be removed and hence carries through to the then non-uniform and unacceptable final product.

As to the function of the additives:

(i) Carrageenan—this helps to prevent aggregation of protein, wheying off, and to obtaining a smooth product of sufficient body. Excessive amounts should be avoided since this is counterproductive and tends to create lumps that impair the texture of the product.

(ii) Citrate ion—this assists in preventing precipitating reactions during the sterilization, i.e. provides a more stable protein dispersion: it functions as a pH buffer and sequesterant for heavy metals. The citrate ion can be included as a salt, such as sodium citrate or as the acid, the latter also fulfilling the role of a pH adjuster if this is required.

(iii) Starch—This assists in the obtaining of a smooth homogenous product having adequate body, the amount of starch required being relatively low in view of the effect of the special processing condtions used.

(iv) Sugar—In this environment, the sugar functions as an essential dispersing agent for the other additives such as the gum which assists in preventing aggregation of the protein and also as a sweetening agent. It is present in an amount of from 3 to 6% by weight, preferably about 4% to 5% by weight.

As stated, the above additives are preferably added to the yoghurt base in an aqueous slurry, the water content of which is calculated so that upon the slurry and the yoghurt base being admixed, the starting total milk solids content, preferably of from 15% to 20% is reduced to a predetermined value between about 10% and 15% usually between about 12 to 14% and preferably about 13% by weight.

Processing

(a) Protein Preconditioning

Simple heating of natural yoghurt results in substantially complete aggregation of the protein as the temperature increases. This produces hard and relatively large lumps of protein and it is practically impossible to convert those lumps to a smaller particulate form where the resulting yoghurt product will not have an unacceptable quality or sandy mouthfeel. A very important feature of the present invention is the temperature/time treatment stage in the process where the protein is "pre-conditioned" in which form it can be transformed in the next special homogenization stage, into a diminuated form which, surprisingly, does not impart a gritty mouthfeel to the product: to the contrary, the product is smooth and creamy. It is believed that in the pre-conditioning stage, the protein is modified denatured forming soft curds or the like which the subsequent mild homogenization stage is able to convert to a particular or the like form having no gritty mouthfeel characteristics.

A further factor which must be taken into account is the effect of the heat treatment on the starch content. Gelatinization of a significant portion of the starch would make the subsequent required treatment of the protein not possible. According to the present invention the required pre-conditioning of the protein can be effected without significant gelatinization of the starch content in two ways following preparation in step (d) of the mixture of base yoghurt and additives:

(a) The said mixture is held at a temperatue of from 140° to 155° F. for a period of from 5 to 20 minutes, following which the temperature is raised as rapidly as possible to 170° F. when the subsequent one stage homogenization stage (f) is effected. This procedure would generally be followed when the process of the invention is operated as a batch process; or (b) The temperature of said mixture is raised rapidly, within about 60 seconds, or so, to about 170° C. when the subsequent one stage homogenization stage (f) is effected. This procedure would normally be operated in continuous process embodiments of the present invention.

Homogenization

Most prior art homogenization procedures utilize a consecutive two-stage procedure involving pressures to 1,500–2,000 psi or more in the first stage. In contradistinction thereto, the process of the present invention involves a single stage homogenization which utilizes an intermediate to low pressure of about 1,500 to 500 psi with pressures of about 750 to 1,250 psi being preferred with about 1,000 psi being especially preferred.

The homgenization must be effected at an elevated temperature of at least 140° F., conveniently at about 150° F. and up to 170° F.

As mentioned previously, yoghurt is structurally a relatively delicate product and the above relatively mild homogenization stage surprisingly results in a product having only a slight increase in viscosity and a smooth texture, any protein particles being of a size and being dispersed in such a manner that the product has a smooth mouthfeel with no gritty feeling. The standard two-stage homogenization procedure usually used, breaks down the yoghurt product and gives a gritty mouthfeel to the product.

Pasteurization

Following homogenization, the temperature of the mixture is raised to effect pasteurization, this preferably being effected in a manner which results in as little as possible work input to the yoghurt, tubular heat exhangers and scraped surface heat exchanges have been found satisfactory for this purpose.

Subsequently, the temperature is lowered to below 85° F. when the mixture is aseptically packed into sterilized retail-size containers. The methods and equipment involved in sterilizing such containers and packing fluid products therein under aseptic or sterile conditions are well known and widely used. The present assignee, for example, operates a Dole Aseptic Line Model No. 520 production facility which is perfectly adapted to being used in association with the present invention.

In common with the processing of such fluid food products, care should be taken to use plant, for example, mixing devices, etc. which as far as possible eliminate the introduction of air into the product, the latter producing product instability and also leads to mold growth and other adverse effects.

It may be noted that it is not essential that the mixture formed by admixing the yoghurt base and the stated additives be immediately processed through the homogenization and pasteurization stages. The mixture may be cooled and subsequently subjected to the protein pre-conditioning stage, the homogenization stage, etc. It is, however, essential that the stated additives be admixed with the base yoghurt at an elevated temperature, starting at more than 100° F., otherwise it is impossible to incorporate those ingredients homogeneously throughout the yoghurt mass.

In fact, the assignee has prepared many batches of sterile or aseptic yoghurt according to the present invention, by the batch process generally detailed above and wherein the additives were commenced to be added to the yoghurt base at the incubation temperature and the addition, and mixing, continued as the resulting mixture slowly cooled. The total mixture was finally cooled to about 40° F. over a period of four (4) hours, mixing of the two components having been completed within about thirty (30) minutes or forty-five (45) minutes, and before the temperature had dropped to below about 85° F. The present invention will be further described, but not limited by, reference to the following specific examples:

EXAMPLE 1

Skim milk powder in the amount of 120 lbs. was added with stirring to 5,700 lbs. of whole milk (3.5% milk solids) heated to a temperature of 100° F., the milk solids content of the mixture being about 17.8 and the butterfat content being about 2.6% The mixture was then homogenized and pasteurized by heating to a temperature of 190° F. for ten minutes following which it was cooled to 110° F. and innoculated with 180 lbs. of a culture of Lactobacillus Bulgaricus and Streptococcus Thermophilus and the whole mass mixed. Incubation was allowed to proceed at a temperature of 110° F. until the pH had dropped from the original value of 6 to about 4.4, this taking about 4 hours. At that time the temperature was quickly raised to about 140° F. when an aqueous slurry containing the following components was added thereto:

| | |
|---|---|
| Citric Acid | 6 lbs. |
| Carragenan[1] | 8 lbs. |
| Sugar (powdered dextrose) | 360 lbs. |
| Pectin[2] | 18 lbs. |
| Starch[3] | 72 lbs. |
| in 17 lbs. of water | |

[1] Lygomme CDS, available from Frank Dempsey & Sons Ltd., Toronto
[2] Pectin JM, available from A/S Kobenhavns Pectinfabrik
[3] Rezista starch, available from Staley Co.

The resulting mixture was heated fairly rapidly (over a period of only about 15 minutes) to 160° F. during which the protein was pre-conditioned, i.e. denatured to some extent so as to form soft curds therewith) and the starch content remained practically unaltered; the whole mixture then being subjected to a one-stage homogenization at a pressure of 1,000 lbs., this stage lasting about 60 minutes.

The material at this stage, was of course, a plain yoghurt base and the above procedure was used to produce a number of similar batches which were then provided with a variety of fruit in the form of a puree and fruit flavour addition to each batch of one of the following natural by fruit/fruit flavour combinations:

Strawberry

Fruit:882.65 lbs.
Naarden strawberry fruit natural Flavour 2P-30981—22.12 lbs. (0.3%)

Raspberry

Fruit 882.65 lbs.
Raspberry Flavour—11.05 lbs. (0.15%)

Peach

Fruit 882.65 lbs. (12%)
Peach Flavour 150.1 lbs. (2.0%)

Orange

Fruit 882.,65 lbs. (12%)
Orange Flavour 7.36 lbs. (0.1%)

The fruit was in the form of a puree containing lumps of the fruit. The natural fruit flavour combination was admixed with the yoghurt and the total mixture heated in a permutator at 190° F. to 200° F. for about five (5) minutes which ensured complete pasteurization and also full gelatinization of the small starch component; following which the desired aseptic fruit yoghurt product was cooled down to below 80° F. in preparation for packing in an aseptic packing line. The line used in this case was Dole Aseptic Line Model No. 520 but it is pointed out that the specific line used and the manner of packing is not an essential feature of the present invention.

EXAMPLE 2

Skim milk powder in the amount of 1.36 kg (3 lbs.) was admixed with stirring into 66 litres of whole milk (33% milk solids) which had been heated to 100° F., the resulting mixture having a milk solids content of about 13.7% and a butterfat content of 2.2%. The mixture was pasteurized by heating at the temperature of greater than 190° F. following which it was cooled to a temperature of between 100° and 110° F., admixed with 1.36 kg (3 lbx.) i.e. 2% by weight of the mixture, with lactobacillus bulgaricus and streptococuus thermophilius culture. Incubation proceeded for about 5.5 hours during which the starting pH of about 6 had dropped to about 4.15. Temperature of the mixture was then raised to between 140° and 145° F. over a period of from 20 to 25 minutes when preconditioning of the protein occurred following which a dry mixture comprising the following components:

TABLE 1

|  | Amount (g) | wt. % of mixture |
| --- | --- | --- |
| citric acid | 68.1 | 0.1 |
| Lygomme CDS | 190.5 | 0.28 |
| sugar (powdered) dextrose | 2.38 | 3.5 |
| Pectin JM | 204.3 | 0.3 |
| Rezista Starch | 816.6 | 1.2 | was sprinkled thereon and the resulting mass homogenized in one-stage homogenizer had just less than 1,000 lbs. pressure for from 15 to 20 minutes. This produced 68 kg (150 lbs.) of the desired plain yoghurt base which was then heated at 190° F. for 2 minutes in a thermotator which ensured pasteurization and also full gelatinization of the minor starch component resulting in development of the desired texture. The product was cooled and packed aseptically as described in Example 1.

Obviously, if desired, the product could have been converted into fruit-flavour products in the same manner as detailed in Example 1.

EXAMPLE 3

A batch of 53.5 kg (96 lbs.) of whole milk having a milk solids content of 3.5% was heated to 100° F. and 970 g (2 lbs.) of 2% skim milk powder added with stirring following which the mixture was heated to 190° F. for ten minutes. Following pasteurization, the mixture was cooled to 110° F. and 970 g (2 lbs.) of the yoghurt culture used in Example 1 mixed therein. Incubation at 110° F. was allowed to continue until the pH had dropped to 4.25, the incubation lasting 4–4.5 hours.

Separately, a drier mixture of the following ingredients were made:

TABLE 2

|  | Amount (g) | wt % of mixture |
| --- | --- | --- |
| citric acid | 45.4 | 0.1 |
| Lygomme CDS | 127 | 0.28 |
| Sugar | 2043 | 4.5 |
| Pectin JM | 136.2 | 0.3 |

TABLE 2-continued

|  | Amount (g) | wt % of mixture |
| --- | --- | --- |
| Rezista Starch | 544.8 | 1.2 |

That mixture was warmed to 130° F. and sprinkled on the incubated substrate, the temperature of which was then raised to 145° F. over a period of some 20 minutes. During that period the required preconditioning of the protein occurred. The whole mixture was then homogenized in a one-stage homogenizing unit at a pressure of 1,000 lbs. for just less than 20 minutes and subsequently pasteurized in a thermotator unit at a temperature of 190° F. for 2 minutes. The product was then cooled to below 80° F. taking the usual precautions to maintain the product in an aseptic condition prior to enduring packaging.

As previously, the product produced was a plain yoghurt and this is readily converted to any of the desired fruit-flavoured products in the same manner as described in Example 1.

It will be noted that the product "lygomme CDS" is a complex of red seaweeds, (Gigartinaceae family), extracts and galactomannans, and is an odorless, tasteless, creamy white powder which is useful as a thickening agent in food application. It forms a 1.0 to 1.5 KcP aqueous solution, (1% weight by volume, after heating), having a pH of between 6 and 8, measured at 20° C.

Similarly, pectin JM, comprises relatively highly methoxylated polygalacturonic acid, and is useful as a stabilizer. 4% aqueous solutions, measured at 25° C., have a pH ranging between 2.7 and 3.2. This product meets the specifications for pectin as set out in the *Food Chemical Codex*, Second Edition, Washington, D.C., 1972.

Also, rezista starch is a modified waxymaize starch which is a "food starch-modified" according to Food Additives Regulation 172.82.

We claim:

1. A process for the production of an aseptic yoghurt comprising:
   (a) maintaining a fluid milk substrate at a pasteurization temperature for a period of time sufficient to effect pasteurization;
   (b) cooling the pasteurized substrate to an incubation temperature of from about 100° F. to about 115° F.;
   (c) subsequently innoculating said substrate with a yoghurt culture producing lactic acid and incubating same at said incubation temperature until the pH is reduced to between about 4.5 and about 4.0, whereby a yoghurt base is produced;
   (d) producing a natural yoghurt by admixing with said yoghurt base, while the temperature thereof is initially greater than 100° F. and before the temperature thereof falls below 85° F., the following components:

| carrageenan: | from about 1% to about 0.8%; |
| --- | --- |
| citrate ion: | from about 0.05% to about 0.2%; |
| starch: | from about 0.5% to about 1.5%; |
| water: | in an amount such that the milk solids content of the total mixture is from about 10% to about 15%; | all percentages being by weight based on the weight of the total admixture;

(e) preconditioning the natural yoghurt whilst substantially avoiding gelatinization of the starch by treating the natural yoghurt by a process selected from the group consisting of:
(i) raising the temperature of the natural yoghurt without interruption from the incubation temperature over a period of from about 0.5 to about 5.0 minutes, with the addition of the components of step (d) being completed before the temperature of the natural yoghurt reaches a temperature of about 145° F.; and,
(ii) raising the natural yoghurt to a temperature of from about 140° F. to about 160° F. and maintaining that temperature for a period of from 5 to 20 minutes;
(f) effecting single state homogenization of the mixture at a homogenization temperature of at least 140° F. up to about 170° F. and at a pressure of from about 500 to about 1500 psi;
(g) pasteurizing the resulting mixture at a temperature of at least 170° F. to produce an aseptic yoghurt; and
(h) cooling the aseptic yoghurt so produced to a temperature of less than 85° F.

2. A process according to claim 1 wherein flavour, aroma imparting agents or mixtures thereof are introduced into the homogenized mixture produced in step (f).

3. A process according to claim 1 wherein in step (d), the components of step (d) are admixed with the yoghurt base whilst the temperature thereof is being reduced from said incubation temperature, of from about 100° F. to about 115° F. to not less than 85° F.

4. A process according to claim 1 wherein up to 0.5% by weight based on the weight of the natural yoghurt, of pectin is also admixed with the yoghurt base in step (d).

5. The process according to claim 1 wherein the homogenization in step (f) is effected at a pressure of from about 800 to about 1200 psi.

6. The process according to claim 1 wherein from about 0.2% to about 0.5% of carrageenan is admixed in step (d).

7. The process according to claim 1 wherein from about 0.075% to about 0.05% of citrate ion is admixed in step (d).

8. The process according to claim 1 wherein from about 0.75% to about 1.25% of starch is admixed in step (d).

9. The process according to claim 1 wherein from about 4% to about 5% of sugar is admixed in step (d).

10. An aseptic yoghurt product produced by the process according to claim 1.

11. A process according to claim 1 wherein preconditioning is accomplished by raising the temperature of the natural yoghurt without interruption from the incubation temperature or lower to the homogenization temperature over a period of from about 0.5 to 5.0 minutes, with addition of the components of step (d) being completed before the temperature of the natural yoghurt reaches a temperature of about 145° F.

12. A process according to claim 1 wherein the preconditioning is accomplised by raising the temperature of the natural yoghurt to a temperature of from about 140° F. to about 160° F. and maintained at that temperature for a period of from 5 to 20 minutes, whereby said preconditioning of the protein is effected.

13. An aseptic yoghurt product produced by the process according to claim 11 wherein step (e) is selected such that the temperature of the natural yoghurt is raised without interruption from the incubation temperature or lower to the homogenization temperature over a period of from about 0.5 to about 5.0 minutes, with addition of the components of step (d) being completed before the temperature of the natural yoghurt reaches a temperature of 145° F.

14. An aseptic yoghurt product produced by the process according to claim 12 wherein step (e) is selected such that the natural yoghurt is raised to a temperature of from about 140° F. to about 160° F. and maintained at that temperature for a period of from 5 to 20 minutes whereby said preconditioning of the protein is effected.

15. An aseptic yoghurt product produced by the process according to claim 3 wherein in step (d) the components of step (d) are admixed with the yoghurt base whilst the temperature thereof is being reduced from an incubation temperature, of from about 100° F. to about 115° F., to not less than 85° F.

16. An aseptic yoghurt product produced by the process according to claim 4 wherein up to 0.5% by weight based on the weight of the natural yoghurt is pectin.

17. An aseptic yoghurt product produced by the process according to claim 1 wherein the incubation temperature of step (b) is from about 108° F. to about 112° F.

18. An aseptic yoghurt product produced by the process according to claim 5 wherein the homogenization in step (f) is effected at a pressure of from about 800 to about 1200 psi.

19. An aseptic yoghurt product produced by the process according to claim 1 wherein the pasteurization of step (a) is effected by heating the milk substrate to a temperature of from about 190° F. to about 210° F. for a period of up to about 30 minutes.

20. An aseptic yoghurt product produced by the process according to claim 6 wherein from about 0.2% to about 0.3% of carrageenan is admixed in step (d).

21. An aseptic yoghurt product produced by the process according to claim 7 wherein from about 0.075% to about 0.05% of citrate ion is admised in step (d).

22. An aseptic yoghurt product produced by the process according to claim 8 wherein from about 0.75% to about 1.25% of starch is admixed in step (d).

23. An aseptic yoghurt product produced by the process according to claim 9 wherein from about 4% to about 5% of sugar is admixed in step (d).

24. An aseptic yoghurt product produced by the process according to claim 1 wherein the milk substrate has a total milk solids content of from 17% to 19%.

* * * * *